United States Patent [19]
Ban et al.

[11] Patent Number: 6,164,262
[45] Date of Patent: Dec. 26, 2000

[54] AUXILIARY APPARATUS FOR A VEHICLE

[75] Inventors: Takashi Ban; Kenji Takenaka; Hidefumi Mori, all of Kariya, Japan

[73] Assignee: Kabushiki Kaisha Toyoda Jidoshokki Seisakusho, Kariya, Japan

[21] Appl. No.: 08/930,118

[22] PCT Filed: Feb. 24, 1997

[86] PCT No.: PCT/JP97/00522

§ 371 Date: Oct. 30, 1997

§ 102(e) Date: Oct. 30, 1997

[87] PCT Pub. No.: WO97/31796

PCT Pub. Date: Sep. 4, 1997

[30] Foreign Application Priority Data

Mar. 1, 1996 [JP] Japan ................................. 8-044395

[51] Int. Cl.[7] .................................................. B60K 25/02
[52] U.S. Cl. ................................... 123/198 R; 124/196 R
[58] Field of Search ........................... 123/196 R, 198 R; 122/26

[56] References Cited

U.S. PATENT DOCUMENTS 3,728,995  4/1973  Schramm ............................ 123/195 A
4,598,677  7/1986  Mongin et al. ..................... 123/195 A Primary Examiner—Willis R. Wolfe
Assistant Examiner—Jason Benton
Attorney, Agent, or Firm—Morgan & Finnegan, L.L.P.

[57] ABSTRACT

This invention aims to allow one of a pair of auxiliary apparatus and the other of the auxiliary apparatus to be handled independently of each other, while satisfying the need to be installed in a limited boarding space and the need to be produced at low production costs. For this purpose, this invention allows an autotensioner idler (ID) which serves as one of the auxiliary apparatus and a viscous heater (VH) which serves as the other of the auxiliary apparatus to transmit power to each other and to be attachable to and detachable from each other.

8 Claims, 4 Drawing Sheets

AUXILIARY APPARATUS FOR A VEHICLE

TECHNICAL FIELD

This invention relates to an auxiliary apparatus for a vehicle.

BACKGROUND ART

Power equipment such as an engine is mounted on a vehicle. Also mounted are auxiliary apparatus such as a water pump, an idler, a power steering hydraulic pump, an alternator, and an air conditioner compressor, which serve functions auxiliary to that of the power equipment. These auxiliary apparatus are driven by the power equipment in a way in which pulleys or electromagnetic clutches of the auxiliary apparatus are connected to the power equipment via a crankshaft pulley and a belt.

By the way, these auxiliary apparatus are installed in a limited boarding space in the periphery of the power equipment in a limited-space power equipment room by being fixed to the power equipment.

In view of the need to be installed in a limited boarding space and the need to be produced at lower production costs by omitting each own pulley and decreasing the number of component parts, a pair of auxiliary apparatus have been conventionally known in which a water pump and a power steering hydraulic pump are combined in a tandem form. In this type of vehicular auxiliary apparatus comprising a pair of auxiliary apparatus, one housing and one driving shaft are commonly used by these two apparatus and a single pulley is secured on this driving shaft. Therefore, by making that pulley connected to power equipment through a crankshaft pulley and a belt, the two apparatus are respectively driven by the power equipment.

In the aforementioned conventional vehicular auxiliary apparatus, however, it is true that the common use of the driving shaft allows these two apparatus to transmit power to each other, but one of the auxiliary apparatus and the other of the auxiliary apparatus cannot be handled independently of each other because the two apparatus cannot be detached from or attached to each other due to the common use of the housing and the driving shaft.

That is to say, these vehicular auxiliary apparatus cannot deal with a situation in which one of the auxiliary apparatus is always needed and the other of the auxiliary apparatus is optionally needed. In addition, in these vehicular auxiliary apparatus, if one of the auxiliary apparatus should become out of order and needs to be mended or replaced with a new one, the other of the auxiliary apparatus must also be dismantled simultaneously, and therefore the mending or replacing operation is troublesome.

This invention has been made in view of the above conventional circumstances. It is an object to be attained to allow one of the auxiliary apparatus and the other of the auxiliary apparatus to be handled independently of each other, while satisfying the need to be installed in a limited boarding space and the need to be produced at lower production costs.

SUMMARY OF THE INVENTION

A vehicular auxiliary apparatus comprises a pair of auxiliary apparatus which are mounted on a vehicle, being combined in a tandem form, and serve functions auxiliary to that of power equipment of the vehicle, and is characterized in that one of the auxiliary apparatus and the other of the auxiliary apparatus can transmit power to each other and are attachable to and detachable from each other.

Since one of the auxiliary apparatus and the other of the auxiliary apparatus can transmit power to each other, each own pulley can be omitted and the number of component parts can be decreased, and therefore this vehicular auxiliary apparatus can be produced at low costs.

Moreover, because one of the auxiliary apparatus and the other of the auxiliary apparatus are attachable to and detachable from each other, these can be handled independently of each other.

That is to say, by detaching one of the auxiliary apparatus from the other of the auxiliary apparatus, the vehicular auxiliary apparatus can deal with a situation in which the one of the auxiliary apparatus is always needed and the other of the auxiliary apparatus is optionally needed. Besides, if one of the auxiliary apparatus should become out of order and has to be mended or replaced with a new one, it is only required to detach the other of the auxiliary apparatus from the one of the auxiliary apparatus, and there is no need to dismantle the other of the auxiliary apparatus simultaneously and therefore this mending or replacing operation is easy.

A vehicular auxiliary apparatus is further characterized in that a driving shaft provided for the one of the auxiliary apparatus and driven by the power equipment is shielded by a housing of the one of the auxiliary apparatus, and a driving shaft provided for the other of the auxiliary apparatus and driven by the power equipment is protruded from a housing of the other of the auxiliary apparatus, and both of the driving shafts are spline-engaged with each other.

Because the driving shaft of the one of the auxiliary apparatus is shielded by the housing of one of the auxiliary apparatus, even when the one of the auxiliary apparatus is driven with the other of the auxiliary apparatus detached from one of the auxiliary apparatus, there is no fear that this driving shaft catches foreign matters. Further, in combining the other of the auxiliary apparatus with the one of the auxiliary apparatus, both the driving shafts are spline-engaged with each other only by bringing both the auxiliary apparatus axially close to each other. Therefore, this vehicular auxiliary apparatus is excellent in terms of assemblage.

A vehicular auxiliary apparatus is further characterized in that a housing of the one of the auxiliary apparatus and a housing of the other of the auxiliary apparatus respectively have a flange which can be connected to each other.

When the flanges of both the housings, which can be connected to each other, are contacted with each other and fastened by bolts or the like, the other of the auxiliary apparatus can be combined with the one of the auxiliary apparatus. Therefore, this vehicular auxiliary apparatus is excellent in terms of assemblage. On the contrary, when bolts or the like are removed and the flanges of the housings of both the auxiliary apparatus are separated from each other, the other of the auxiliary apparatus can be detached from the one of the auxiliary apparatus. Accordingly, this vehicular auxiliary apparatus is excellent in terms of dismantlement.

A vehicular auxiliary apparatus is further characterized in that the other of the auxiliary apparatus is a viscous heater, including a heater housing in which a heat-generating chamber and an auxiliary water jacket adjacent to the heat-generating chamber are formed, a heater driving shaft held rotatably by the heater housing with a bearing device disposed therebetween, and a plate-shaped rotor provided in the heat-generating chamber and being rotatable by the heater driving shaft, and causing a viscous fluid disposed in a space between a wall surface of the heat-generating chamber and an outer surface of the rotor to generate heat by rotating the rotor, and to be heat-exchanged with the aforementioned circulating water in the auxiliary water jacket.

When a driving shaft of the one of the auxiliary apparatus is driven by the power equipment by way of a pulley or the like, the one of the auxiliary apparatus performs its function, and at the same time, in the viscous heater which serves as the other of the auxiliary apparatus, the rotor is rotated in the heat-generating chamber. Accordingly, the viscous fluid generates heat by shearing in the space between the wall surface of the heat-generating chamber and the outer surface of the rotor. This generated heat of the viscous fluid is transferred to the circulating water flowing in the auxiliary water jacket of the viscous heater. Thus, the heating of a compartment of vehicle can be achieved not only by heat generation of the power equipment by also by heat generation of the viscous heater. As a result, the compartment of vehicle can be sufficiently heated in starting the power equipment in cold places or the like.

Moreover, since the rotor which rotates in the heat-generating chamber of the viscous heater serving as the other of the auxiliary apparatus has the shape of a plate, the viscous heater has a small thickness and the size of the power equipment and its accessories is not very large. Consequently, the vehicular auxiliary apparatus does not need a large boarding space in the power equipment room.

A vehicular auxiliary apparatus is further characterized in that one of the auxiliary apparatus is an idler.

The one of the auxiliary apparatus which is an idler may comprise an arm provided swingably on a housing of the power equipment, an idler shaft provided rotatably on this arm with a bearing device disposed therebetween, and serving as a driving shaft of the one of the auxiliary apparatus, and an idler pulley secured on this idler shaft. It is also possible to employ an autotensioner idler wherein a bracket is fixed on a housing of the power equipment and an arm is provided swingably on this bracket with a torsion coil spring interposed therebetween. Here, the function of the idler is to stabilize torque by keeping tension of a belt constant and fixing the position of the belt which is carried on a pulley or the like of the other of the auxiliary apparatus. Therefore, most of the overall size of the idler is occupied by the idler pulley and there is a relatively large boarding space in the vicinity of the idler. Therefore, the vehicular auxiliary apparatus in which the one of the auxiliary apparatus is an idler is the most excellent in terms of boardability in the power equipment room, if a housing of the other of the auxiliary apparatus is provided swingably on the housing of the power equipment.

A vehicular auxiliary apparatus is further characterized in that one of the auxiliary apparatus is a hydraulic pump for power steering.

Hydraulic fluid of a power steering hydraulic pump is used for lubricating a bearing device of the other of the auxiliary apparatus, whereby the durability of the other of the auxiliary apparatus can be improved.

A vehicular auxiliary apparatus is further characterized in that one of the auxiliary apparatus is an alternator.

In general, in the one of the auxiliary driving apparatus which is an alternator, the rotational speed of a pulley is set approximately two times as high as that of a crankshaft pulley in view of chargeability on a battery. Therefore, the vehicular auxiliary apparatus in which one of the auxiliary apparatus is an alternator can make the other of the auxiliary apparatus perform its function more effectively, because a driving shaft of the other of the auxiliary apparatus is rotated at a high speed.

BEST MODE FOR CARRYING OUT THE INVENTION

Figure 1:
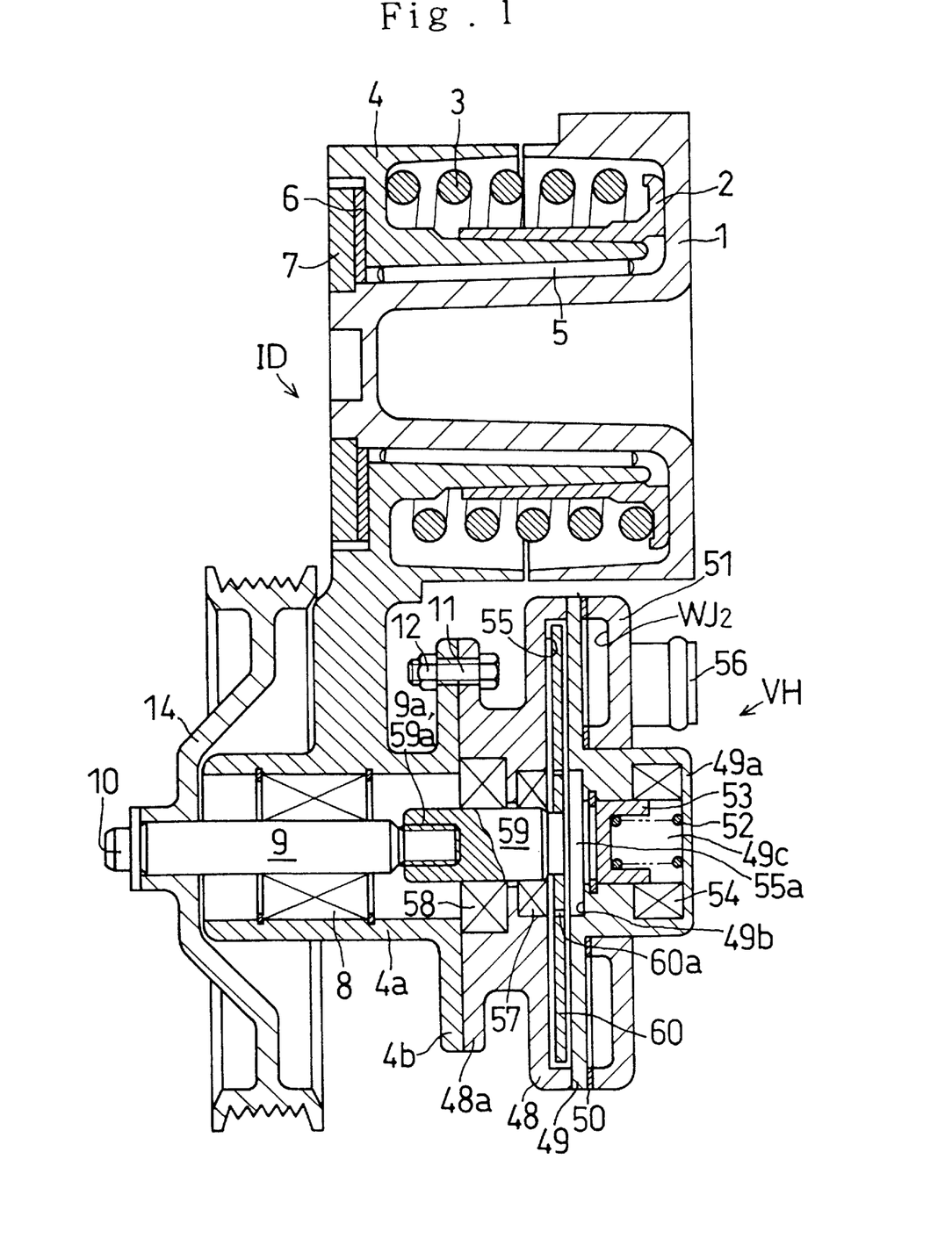
FIG. 1 is a vertical cross-sectional view of a vehicular auxiliary apparatus according to the First Preferred Embodiment.

Hereinafter, the First through Third Preferred Embodiments embodying the invention set forth in the respective claims will be described with reference to the drawings.
First Preferred Embodiment As shown in FIG. 1, this vehicular auxiliary apparatus employs an autotensioner idler ID as one of a pair of auxiliary apparatus, and a viscous heater VH as the other of the auxiliary apparatus.

Figure 2:
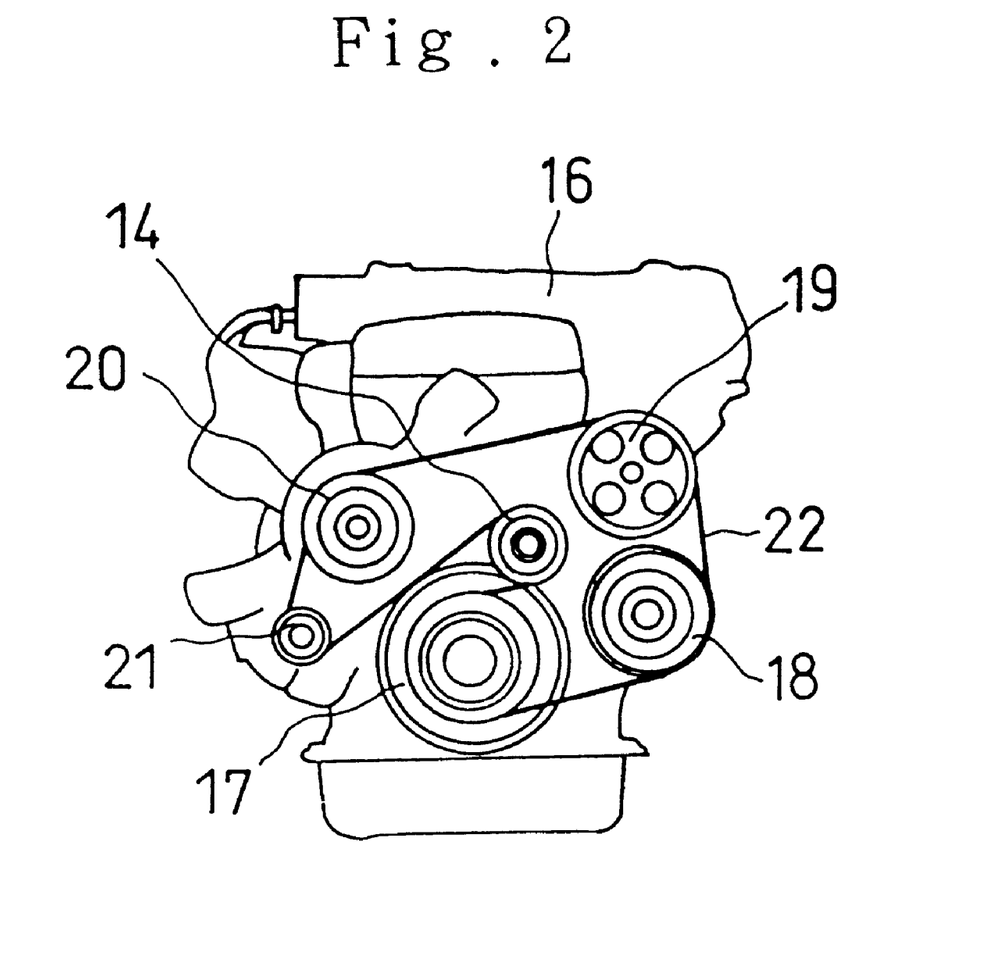
FIG. 2 is a front view of the neighborhood of an engine according to the First through Third Preferred Embodiments.

Specifically, as for the autotensioner idler ID, a bracket 1 is fixed on a housing of an engine 16 shown in FIG. 2, and an arm 4, which serves as a housing of the autotensioner idler ID, is provide on the bracket 1 with a torsion coil spring 3 held by a washer 2 interposed between the arm 4 and the bracket 1. This arm 4 is provided with a bearing device 5 between a bearing portion of the arm 4 and a shaft portion of the bracket 1, and is prevented from being slipped off by providing a fastening device 7 at a fore end of the shaft portion of the bracket 1 with a plain bearing 6 interposed therebetween, whereby the arm 4 is made swingable by the torque of the torsion coil spring 3.

Part of this arm 4 is extended in a circumferential direction, and a boss portion 4a is formed at its fore end. An idler shaft 9 is rotatably provided in this boss portion 4a with a bearing device 8 interposed therebetween. An idler pulley 14 is secured by a bolt 10 at a fore end of the idler shaft 9 which protrudes from a fore end of the boss portion 4a. As shown in FIG. 2, the idler pulley 14 is rotated together with an air conditioner electromagnetic clutch 18, a power steering pulley 19, a water pump pulley 20, and an alternator pulley 21 by a crankshaft pulley 17 and a belt 22. As shown in FIG. 1, a flange 4b is formed on a rear end side of the boss portion 4a of the arm 4, and a rear end of the idler shaft 9 on which outer splines 9a are formed is shielded in the flange 4b.

On the other hand, as for the viscous heater VH, a front housing 48, a rear plate 49, and a rear housing body 51, which constitute a heater housing, are respectively overlapped and fastened by a plurality of through bolts not shown, with a gasket 50 interposed between the rear plate 49 and the rear housing body 51.

The rear plate 49 integrally hals a case 49a protruding backward, in its center region. A first concave portion 49b is formed in the center region of a front end surface of this rear plate 49, and a second concave portion 49c extending into the case 49a is formed in the first concave portion 49b. In the meanwhile, a concave portion formed on a rear end surface of the front housing 48 constitutes a heat-generating chamber 55 together with the flat front end surface of the rear plate 49. A rear end surface of the rear plate 49 and an inner surface of the rear housing body 51 constitute an auxiliary water jacket WJ2 which adjoins the back of the heat-generating chamber 55. At an outer periphery of the rear housing body 51, there are a water inlet port 56 and a water outlet port not shown which adjoin each other, and the water inlet port 56 and the water outlet port communicate with the auxiliary water jacket WJ2. This auxiliary water jacket WJ2 communicates with a main water jacket not shown and formed on a cylinder block or the like of the engine 16 shown in FIG. 2, and also communicates with a radiator and a heater core not shown.

A spool 53 formed of an iron-based material is slidably held in the second concave portion 49c of the case 49a, and urged forward by a pressure spring 52, and the fore end position of the spool 53 is restricted. A solenoid 54 is provided at a rear end of the second concave portion 49c. Thus, a control charmer 55a, which communicates with the center region of the heat-generating chamber 55, is formed before the spool 53. The solenoid 54 is energized or deenergized upon a driver's turning on or off of its control switch or the like.

In addition, a heater driving shaft 59 is rotatably held in the front housing 48 with a shaft seal device 57 and a bearing device 58 interposed therebetween. At a rear end of the heater driving shaft 59, a plate-shaped rotor 60 is press-fitted so that it can rotate in the heat-generating chamber 55. The center region of the rotor 60 is provided with a plurality of through holes 60a which penetrate the rotor 60 in an axial direction. Silicone oil is provided in a space between a wall surface of the heat-generating chamber 55 and an outer surface of the rotor 60, and works as a viscous fluid. A flange 48a is formed on a fore end side of the front housing 48, and a fore end of the heater driving shaft 59 on which inner splines 59a are formed is protruded from the flange 48a.

In this vehicular auxiliary apparatus, when the autotensioner idler ID and the viscous heater VH are brought axially close to each other, and the flange 4b and the flange 48a are contacted with each other and fastened by bolts 11 and nuts 12, the outer splines 9a of the idler shaft 9 and the inner splines 59a of the heater driving shaft 59 are spline-engaged with each other, whereby the viscous heater Vh can be combined with the autotensioner idler ID. Accordingly, this auxiliary apparatus is excellent in terms of assemblage. Instead of spline-engagement, it is also possible to employ other connecting means which allow the auxiliary apparatus to be attachable to and detachable from each other and allow the auxiliary apparatus to transmit power to each other, for example, by using keys or the like.

In this vehicular auxiliary apparatus in which the viscous heater VH is thus combined with the autotensioner idler ID, with respect to the autotensioner idler ID, the idler shaft 9 is driven by the engine 16 by way of the idler pulley 14, while the arm 4 is swung by the torque of the torsion coil spring 3. Therefore, the autotensioner idler ID keeps the tension of the belt 22 constant and fixes the position of the belt 22 which engages with the air conditioner electromagnetic clutch 18 and so on, thereby serving to stabilize torque. On the other hand, with respect to the viscous heater VH, since the rotor 60 is rotated in the heat-generating chamber 55, the silicone oil generates heat by shearing in the space between the wall surface of the heat-generating chamber 55 and the outer surface of the rotor 60. The generated heat of the silicone oil is transferred to the circulating water flowing in the auxiliary water jacket WJ2 of the viscous heater VH. Thus, the heating of the compartment of vehicle can be achieved not only by heat generation of the engine 16 but also by heat generation of the viscous heater VH. Consequently, in this vehicular auxiliary apparatus, the engine e room can be heated sufficiently in starting the engine 16 in cold places or the like.

When the solenoid 54 is energized upon external input, the spool 53 enlarges the inner volume of the control chamber 55a against the pressure of the pressure spring 52 so that the silicone oil in the heat-generating chamber 55 is recovered in the control chamber 55a due to the Weissenberg effect. In the meanwhile, the silicone oil existing on the front end surface side of the rotor 60 tends to go through the through holes 60a to reach the control chamber 55a. Thus, in this vehicular auxiliary apparatus, it is possible to decrease the heat generating power of the viscous heater VH in order to prevent excessive heating and in order not to damage the cooling of the circulating water by a radiator and furthermore the cooling of the engine 16.

Moreover, in this vehicular auxiliary apparatus, the viscous heater VH is installed in a boarding space behind the autotensioner idler ID. In addition, because the rotor 60 of the viscous heater VH, which rotates in the heat-generating chamber 55, has the shape of a plate, the viscous heater VH has a small thickness. Therefore, in this vehicular auxiliary apparatus, the engine 16 and its accessories are not large in size, and are the most excellent in terms of boardability in the compartment of vehicle.

On the contrary, if the bolts 11 and the nuts 12 are removed and the flange 4b of the autotensioner idler ID and the flange 48a of the viscous heater VH are separated from each other, the spline-engagement of the outer splines 9a of the idler shaft 9 and the inner splines 59a of the heater driving shaft 59 are released, and the viscous heater VH can be detached from the autotensioner idler ID. Therefore, this vehicular auxiliary apparatus is excellent in terms of dismantlement.

In this case, it is possible to deal with a situation in which only the autotensioner idler ID is always needed and the viscous heater VH is optionally needed. This means that vehicles for cold places where the viscous heater VH is offered as an option and vehicles for warm places where the viscous heater VH is not ordinarily needed can be produced in accordance with a uniform design. Therefore, it becomes possible to realize an improvement in the function of a vehicle and a decrease in production costs. In addition, in this vehicular auxiliary apparatus, if the autotensioner idler ID should become out of order and needs to be mended or replaced, it is only required to detach the viscous heater VH from the autotensioner idler ID and there is no need to dismantle the viscoue heater VH at the same time. So, the mending or replacing operation is easy.

Thus, in this vehicular auxiliary apparatus, because the autotensioner idler Id and the viscous heater VH are attachable to and detachable from each other, they can be handled independently of each other.

In addition, in this vehicular auxiliary apparatus, even when the idler shaft 9 is driven with the viscous heater VH detached from the autotensioner idler ID, there is no fear that the idler shaft 9 catches foreign matters because the idler shaft 9 is shielded in the flange 4b.

Moreover, in this vehicular auxiliary apparatus, because the autotensioner idler ID and the viscous heater VH are constructed to transmit power to each other and made attachable to and detachable from each other, the autotensioner idler ID and the viscous heater VH commonly use the idler pulley 14 and don't use each own pulley. Therefore, this vehicular auxiliary apparatus can reduce the number of its component parts and can be produced at low costs.

Note that it is also possible to employ the viscous heater VH as one of the auxiliary apparatus and the autotensioner idler ID as the other of the auxiliary apparatus.

Second Preferred Embodiment

Figure 3:
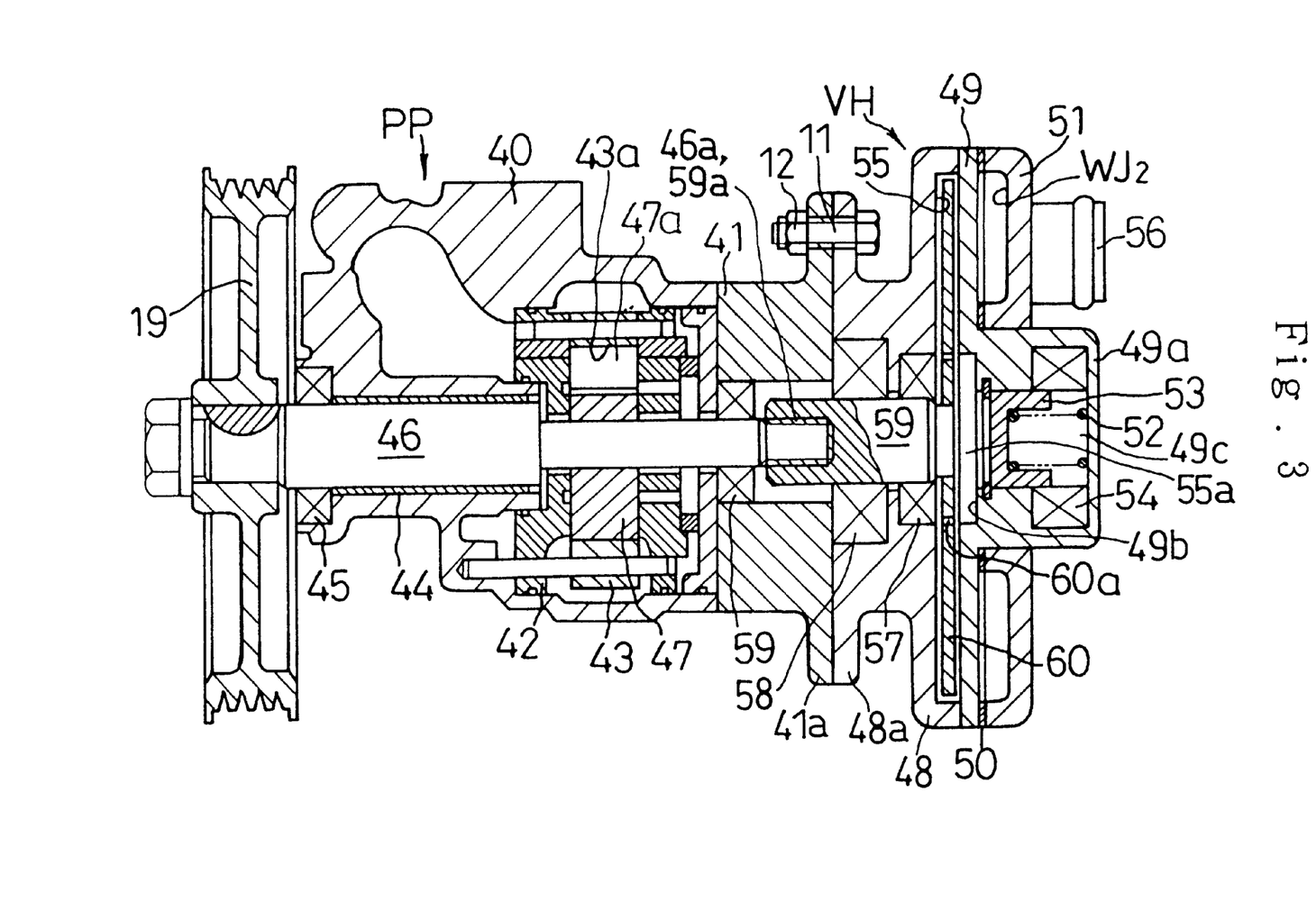
FIG. 3 is a vertical cross-sectional view of a vehicular auxiliary apparatus according to the Second Preferred Embodiment.

As shown in FIG. 3, this vehicular auxiliary apparatus employs a power steering hydraulic pump PP as one of a pair of auxiliary apparatus and a viscous heater VH as the other of the auxiliary apparatus.

Specifically, as for the power steering hydraulic pump PP, a plate 41 is fastened to a front housing 40, and in the front housing 40 and the plate 41, a cam ring 43 having a pump chamber 43a is fixed by being pinched by a pair of plates 42. In an axial through hole formed on the front housing 40, a pump driving shaft 46 is rotatably held with a plain bearing 44 and a shaft seal device 45 disposed therebetween. A power steering pulley 19 shown in FIG. 2 is secured on a fore end of the pump driving shaft 46, and a shaft seal device 59 is provided between a rear end portion of the pump driving shaft 46 and the plate 41. A vane rotor 47 rotatable in the pulip chamber 43a is secured on this pump driving shaft 46, and the vane rotor 47 has a plurality of vanes 47a which are retractable in radial directions.

A flange 41a is formed on a rear end side of the plate 41, and a rear end of the pump driving shaft 46 on which outer splines 46a are formed is shielded in the flange 41a.

The viscous heater VH employed as the other of the auxiliary apparatus is of the same kind as employed in the First Preferred Embodiment.

In this vehicular auxiliary apparatus, when the power steering hydraulic pump PP and the viscous heater VH are brought axially close to each other and the flange 41a and the flange 48a are contacted with each other and fastened by bolts 11 and nuts 12, the outer splines 46a of the pump driving shaft 46 and the inner splines 59a of the heater driving shaft 59 are spline-engaged with each other, whereby the viscous heater VH can be combined with the power steering hydraulic pump PP.

In this vehicular auxiliary apparatus in which the viscous heater VH is combined with the power steering hydraulic pump PP, in regard to the power steering hydraulic pump PP, when the pump driving shaft 46 is driven by the engine via the power steering pulley 19, the vane rotor 47 rotates in the pump chamber 43a of the cam ring 43, thereby exhibiting the function of the pump. On the other hand, since the heater driving shaft 59 of the viscous heater VH is also driven simultaneously, the rotor 60 is rotated in the heat-generating chamber 55 and the compartment of vehicle and the engine 16 can be heated sufficiently in starting the engine in cold places or the like.

In addition, in this vehicular auxiliary apparatus, since a very small amount of the hydraulic fluid of the power steering hydraulic pump PP tends to reach the bearing device 58 of the viscous heater VH through the shaft seal device 59, the bearing device 58 can be lubricated with that hydraulic fluid, whereby the durability of the viscous heater VH can be improved.

Other operations and advantages of this preferred embodiment are similar to those of the First Preferred Embodiment.

Note that it is also possible to employ the viscous heater VH as one of the auxiliary apparatus and the power steering hydraulic pump PP as the other of the auxiliary apparatus.

Third Preferred Embodiment

Figure 4:
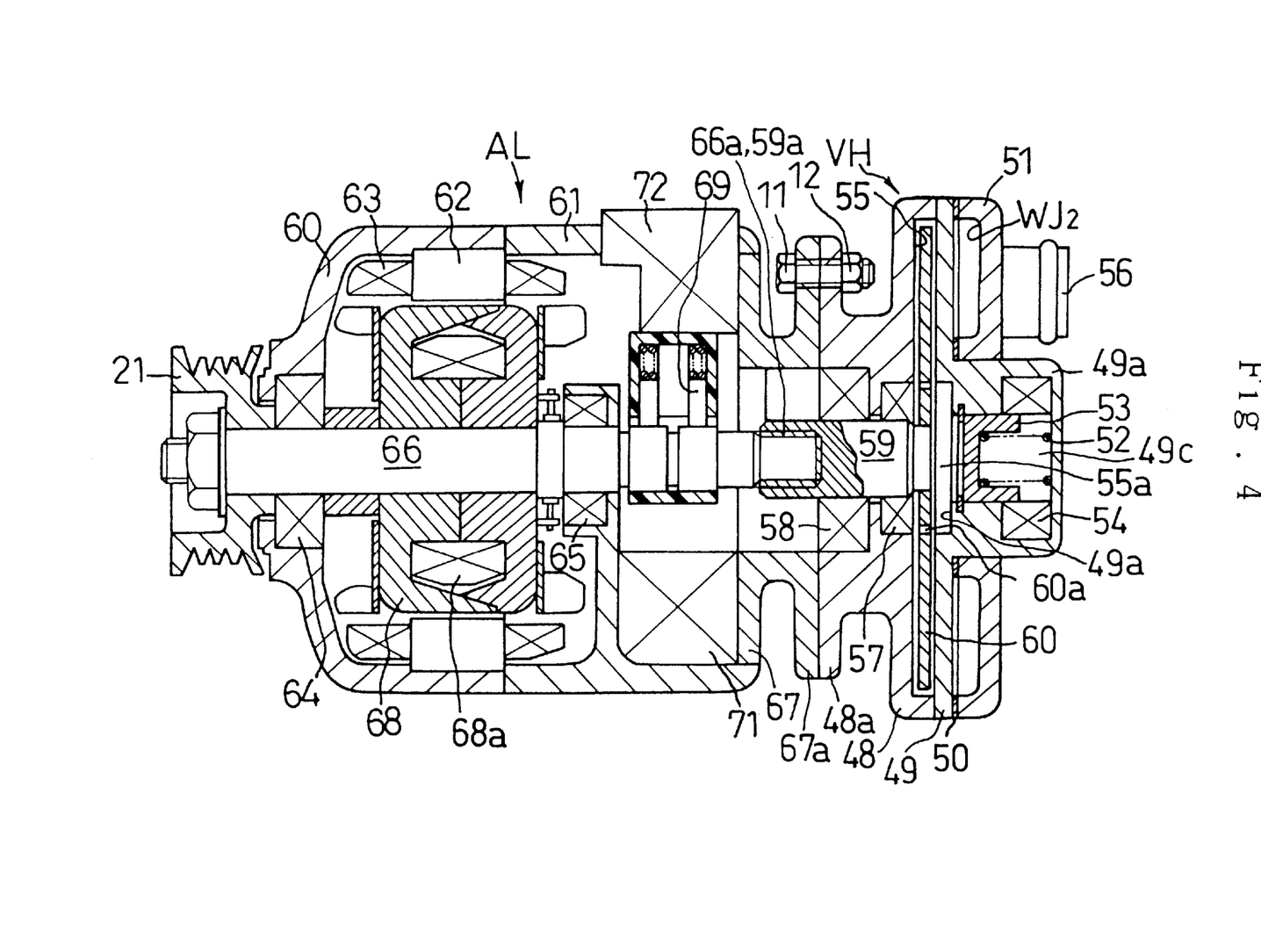
FIG. 4 is a vertical cross-sectional view of a vehicular auxiliary apparatus according to the Third Preferred Embodiment.

As shown in FIG. 4, this vehicular auxiliary apparatus employs an alternator AL as one of a pair of auxiliary apparatus and a viscous heater VH as the other of the auxiliary apparatus.

Specifically, as for the alternator AL, a first central housing 61 is fastened to a front housing 60, and a stator core 62 is fixed in the front housing 60 and the first central housing 61, and a stator coil 63 is wound around the stator core 62. The stator coil 63 is connected to a rectifier 71 and a voltage regulator 72. An alternator driving shaft 66 is rotatably held in the front housing 60 and the first central housing 61 with bearing devices 64 and 65 interposed therebetween. An alternator pulley 21 shown in FIG. 2 is secured on a fore end of the alternator driving shaft 66, and a rear end of the alternator driving shaft 66 is protruded into a second central housing 57 mentioned later. A rotor core 68 is secured on this alternator driving shaft 66, and a field coil 68a to which an electric current is supplied by a brush 69 or the like is provided in a bobbin of the rotor core 68.

The second central housing 67 is fastened to the first central housing 61, and a flange 67a is formed on a rear end side of the second central housing 67, and a rear end of the alternator driving shaft 66 on which outer splines 66a are formed is shielded in the flange 67a.

The viscous heater VH employed as the other of the auxiliary apparatus is of the same kind as employed in the First Preferred Embodiment.

In this vehicular auxiliary apparatus, when the alternator AL and the viscous heater VH are brought axially close to each other and the flange 67a and the flange 48a are contacted with each other and fastened by bolts 11 and nuts 12, the outer splines 66a of the alternator driving shaft 66 and the inner splines 59a of the heater driving shaft 59 are spline-engaged with each other, whereby the viscous heater VH can be combined with the alternator AL.

In this vehicular auxiliary apparatus in which the viscous heater VH is thus combined with the alternator AL, when the alternator driving shaft 66 of the alternator AL is driven by the engine 16 by way of the alternator pulley 21, the rotor core 68 having the field coil 68a rotates in the stator coil 63, thereby exhibiting the function of power generation. On the other hand, because the heater driving shaft 59 of the viscous heater VH is also driven at the same time, the rotor 60 is rotated in the heat-generating chanter 55 and accordingly the compartment of vehicle and the engine 16 can be heated sufficiently in starting the engine in cold places or the like.

In addition, in this vehicular auxiliary apparatus, since the heater driving shaft 59 is rotated at a high speed, a more effective heating effect can be exhibited.

Other operations and advantages of this preferred embodiment are similar to those of the First Preferred Embodiment.

Note that it is also possible to employ the viscous heater VH as one of the auxiliary apparatus, and the alternator AL as the other of the auxiliary apparatus.

In addition to the First to Third Preferred Embodiments, it is also possible to employ an air conditioner compressor, a super charger or the like as one or the other of a pair of auxiliary apparatus, and a viscous heater VH as the other or one of the auxiliary apparatus.

What is claimed is:

1. An auxiliary apparatus for a vehicle, comprising a pair of auxiliary apparatus which are mounted on a vehicle, are combined in a tandem form and serve functions auxiliary to that of power equipment of said vehicle, wherein one of said auxiliary apparatus and the other of said auxiliary apparatus can transmit power to each other and are attachable to and detachable from each other, wherein a driving shaft provided for one of said auxiliary apparatus and driven by said power equipment is shielded by a housing of said one of said auxiliary apparatus, a driving shaft provided for said other of said auxiliary apparatus and driven by said power equipment is protruded from a housing of said other of said auxiliary apparatus, wherein said other of said auxiliary apparatus is a viscous heater, including a heater housing in which a heat-generating chamber and an auxiliary water jacket adjacent to said heat-generating chamber are formed, a heater driving shaft held rotatably by said heater housing with a bearing device disposed therebetween, and a rotor provided in said heat-generating chamber and being rotatable by said heater driving shaft, and causing a viscous fluid disposed in a space between a wall surface of said heat-generating chamber and an outer surface of said rotor to generate heat by rotating said rotor and to be heat-exchanged with said circulating water in said auxiliary water jacket.

2. An auxiliary apparatus for a vehicle according to claim 1, wherein said one of said auxiliary apparatus is an idler.

3. An auxiliary apparatus for a vehicle according to claim 1, wherein said one of said auxiliary apparatus is a hydraulic pump for power steering.

4. An auxiliary apparatus for a vehicle according to claim 1, wherein said one of said auxiliary apparatus is an alternator.

5. An auxiliary apparatus for a vehicle, comprising a pair of auxiliary apparatus which are mounted on a vehicle, are combined in a tandem form and serve functions auxiliary to that of power equipment of said vehicle, wherein one of said auxiliary apparatus and the other of said auxiliary apparatus can transmit power to each other and are attachable to and detachable from each other, wherein said other of said auxiliary apparatus is a viscous heater, including a heater housing in which a heat-generated chamber and an auxiliary water jacket adjacent to said heat-generating chamber are formed, a heater driving shaft held rotatably by said heater housing with a bearing device disposed therebetween, and a rotor provided in said heat-generated chamber and being rotatable by said heater driving shaft, and causing a viscous fluid disposed in a space between a wall surface of said heat-generating chamber and an outer surface of said rotor to generate heat by rotating said rotor and to be heat-exchanged with said circulating water in said auxiliary water jacket.

6. An auxiliary apparatus for a vehicle according to claim 5, wherein said one of said auxiliary apparatus is an idler.

7. An auxiliary apparatus for a vehicle according to claim 5, wherein said one of said auxiliary apparatus is a hydraulic pump for power steering.

8. An auxiliary apparatus for a vehicle according to claim 5, wherein said one of said auxiliary apparatus is an alternator.

* * * * *

UNITED STATES PATENT AND TRADEMARK OFFICE
CERTIFICATE OF CORRECTION

PATENT NO. : 6,164,262
DATED : December 26, 2000
INVENTOR(S) : Ban et al.

It is certified that error appears in the above-identified patent and that said Letters Patent is hereby corrected as shown below:

Column 4,
Line 58, please change "hals" to -- has --.

Column 6,
Line 1, please change "engine e room can be heated" to -- engine and the compartment of the vehicle can be heated --
Line 46, please change "viscoue" to -- viscous --

Signed and Sealed this

Second Day of July, 2002

Attest:

Attesting Officer

JAMES E. ROGAN
Director of the United States Patent and Trademark Office